(12) United States Patent
Yoshida

(10) Patent No.: US 7,125,073 B2
(45) Date of Patent: Oct. 24, 2006

(54) CHILD SEAT

(75) Inventor: Ryoichi Yoshida, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/742,928

(22) Filed: Dec. 23, 2003

(65) Prior Publication Data

US 2004/0169406 A1    Sep. 2, 2004

(30) Foreign Application Priority Data

| Feb. 25, 2003 | (JP) | ............................. 2003-047741 |
| Apr. 16, 2003 | (JP) | ............................. 2003-111774 |
| Apr. 16, 2003 | (JP) | ............................. 2003-111776 |
| Apr. 16, 2003 | (JP) | ............................. 2003-111777 |

(51) Int. Cl.
*B60N 2/42*   (2006.01)
(52) U.S. Cl. ............................. 297/216.11; 297/250.1; 297/216.12
(58) Field of Classification Search ............. 297/250.1, 297/184.13, 216.11, 216.12
See application file for complete search history.

(56) References Cited

U.S. PATENT DOCUMENTS

| 3,265,438 | A | * | 8/1966 | Regan et al. ........... 297/452.41 |
| 4,342,483 | A | * | 8/1982 | Takada ....................... 297/488 |
| 4,643,474 | A |   | 2/1987 | Wise et al. |
| 4,865,388 | A | * | 9/1989 | Nemoto ....................... 297/403 |
| 4,899,961 | A | * | 2/1990 | Herndon .............. 244/122 AG |
| 5,143,420 | A | * | 9/1992 | Switlik .................. 297/216.11 |
| 5,292,176 | A | * | 3/1994 | Artz .......................... 297/250.1 |
| 5,567,015 | A | * | 10/1996 | Arias .......................... 297/397 |
| 5,655,817 | A | * | 8/1997 | Nienow ....................... 297/465 |
| 5,779,304 | A | * | 7/1998 | Cunningham .......... 297/216.11 |
| 6,045,183 | A | * | 4/2000 | Weber ...................... 297/250.1 |
| 6,827,400 | B1 | * | 12/2004 | Menon et al. ........... 297/250.1 |

FOREIGN PATENT DOCUMENTS

| DE | 44 46 595 A1 | 10/1995 |
| DE | 197 05 500 A1 | 8/1998 |
| DE | 198 00 078 A1 | 7/1999 |
| DE | 199 32 801 A1 | 1/2001 |
| EP | 0931694 A2 | 7/1999 |
| GB | 2 323 571 A | 9/1998 |
| JP | 61-235251 | 10/1986 |
| JP | 64-37743 | 3/1989 |
| JP | 1-61165 | 4/1989 |
| JP | 10-157553 | 6/1998 |
| JP | 10157553 | 6/1998 |
| JP | 11011192 | 1/1999 |
| JP | 2000289504 | 10/2000 |
| JP | 2001-341611 | 12/2001 |
| JP | 2001341611 | 12/2001 |

\* cited by examiner

*Primary Examiner*—Peter R. Brown
*Assistant Examiner*—Joseph Edell
(74) *Attorney, Agent, or Firm*—Manabu Kanesaka

(57) ABSTRACT

A child seat includes a seat body having a seat portion, a backrest, and right and left side guards; and a cushion disposed on an outer side surface of the side guards. The cushion may include a gasbag filled with gas. The child seat may further include vent portion for discharging the gas in the gasbag when a gas pressure in the gasbag exceeds a predetermined pressure. When a high load is exerted on the gasbag, the gas is discharged through the vent portion, thereby absorbing a shock.

11 Claims, 5 Drawing Sheets

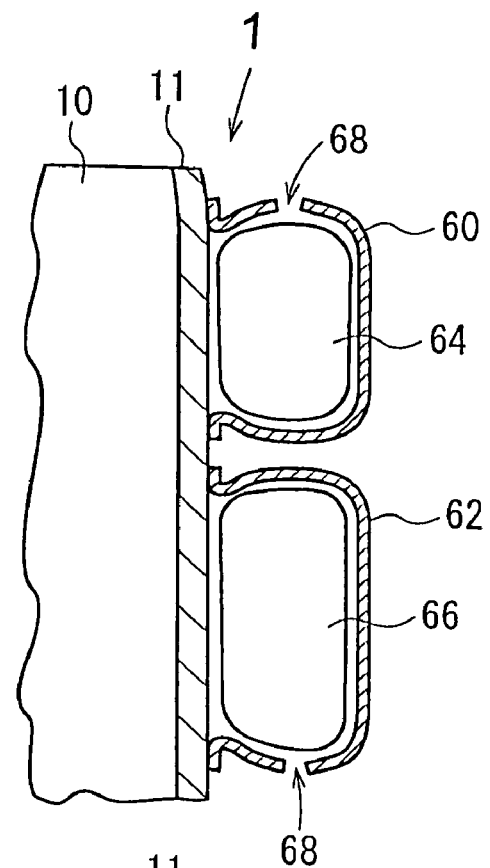
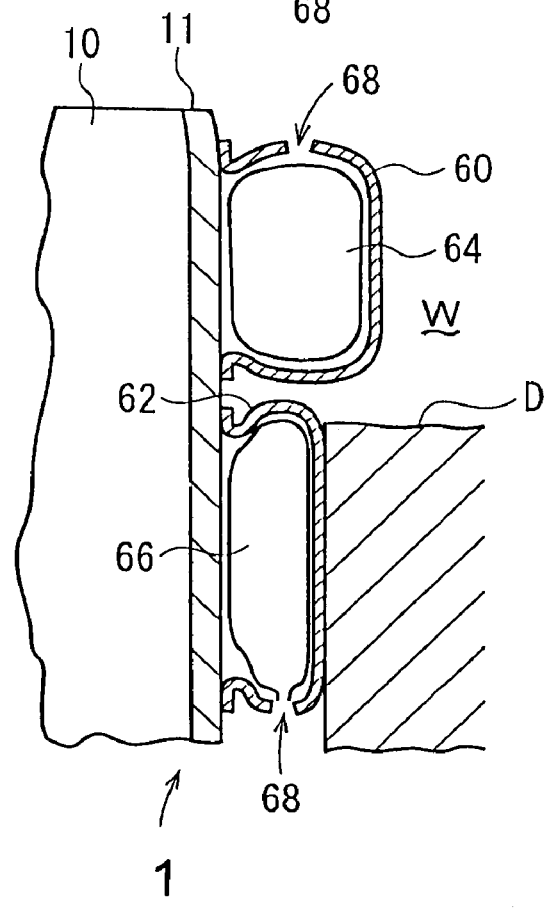

CHILD SEAT

BACKGROUND OF THE INVENTION AND RELATED ART STATEMENT

The present invention relates to a child seat used in an automobile and the like. In particular, the present invention relates to a child seat with a cushion for receiving an impact.

A conventional child seat installed in an automobile has a seat body for accommodating a child and a seatbelt for supporting the child. A child seat may be provided with an impact shield disposed in front of an abdomen of a child (Japanese Patent Publication (Kokai) No. 61-235251). The seat body includes a seat portion for placing a buttock of the child, a backrest for placing a back of the child, and left and right side guards located on left and right sides of the child.

Japanese Patent Publication (Kokai) No. 2001-341611 has disclosed a child seat in which two arms extend upwardly from left and right sides of a seat body towards a front of the child seat and an airbag module is disposed between ends of the arms. The airbag module includes a cylindrical diffuser housing with a build-in inflator (gas generator) and an airbag disposed around a circumference of the diffuser housing. A collision sensor is provided on the seat body. When the collision sensor sends a signal upon a collision, the inflator is activated to generate gas. The gas inflates the airbag widely in front of the child sitting in the child seat.

Japanese Patent Publication (Kokai) No. 10-157553 has disclosed a child seat in which when a high-load is applied due to an automobile collision, an airbag is inflated along outer surfaces of left and the right side guards (side support portions) for protecting a child.

Japanese Utility Model Publication (Kokai) No. 64-37743 has disclosed a child seat in which a concave headrest is disposed around a head portion of a child from a backside to left and the right sides.

In the airbag module disclosed in Japanese Patent Publication (Kokai) No. 2001-341611, the inflator has a heavy weight, thereby increasing a weight of the child seat. Moreover, it is necessary to provide an activation mechanism for the inflator, thereby increasing a cost of the child seat.

In the child seat disclosed in Japanese Patent Publication (Kokai) No. 10-157553, the airbag is inflated along the entire outer surfaces of the side guards. Accordingly, it is necessary to provide a large-capacity inflator. In a case that the airbag is inflated when a person sits closely next to the child seat, the airbag may be inflated between the person and the child seat, thereby applying an unexpected external force to the person.

In the child seat disclosed in Japanese Utility Model Publication No. 64-37743, the headrest is situated around the head portion of the child at all the time, thereby causing discomfort to the child.

In view of the problems described above, an object of the present invention is to provide a child seat with a simple and lightweight structure for sufficiently protecting a child.

Further objects and advantages of the invention will be apparent from the following description of the invention.

SUMMARY OF THE INVENTION

According to the first embodiment of the present invention, a child seat includes a seat body including a seat portion, a backrest, and right and left side guards; and a cushion disposed on an outer side surface of at least one of the side guards. The cushion may include a gasbag filled with gas. The child seat may further include vent means for discharging the gas in the gasbag when a gas pressure in the gasbag exceeds a predetermined pressure. When a high load is exerted on the gasbag, the gas is discharged through the vent means, thereby absorbing a shock. When a load exerted on the gasbag is too small to operate the vent means of the gasbag in a car collision, the child seat can be continuously used as it is without repair.

According to the second embodiment of the present invention, a child seat includes a plurality of cushion parts. When only some of the cushion parts are pushed, the gas in the cushion parts does not escape into the other cushion parts, so that the impact is sufficiently absorbed. At least some of the cushion parts may be arranged in vertically different positions. When a side of the car body pushes only the cushion parts at a lower side and does not push the cushion parts at an upper side in a side crash, the cushion parts at the lower side absorb the impact. This embodiment is suitable for a case that the cushion parts at the upper side face a window opening of the door and the cushion parts at the lower side face a door trim.

In the second embodiment, the child seat may include a cushion having an interior partitioned into a plurality of hollow spaces. When only some of the hollow spaces are pushed, the gas in the hollow spaces does not escape into the other hollow spaces, so that the impact is sufficiently absorbed. At least some of the hollow spaces may be arranged in vertically different positions. When a side of the car body pushes only the hollow spaces at a lower side and does not push the hollow spaces at an upper side in a side crash, the hollow spaces at the lower side absorb the impact. This embodiment is suitable for a case that the hollow spaces at the upper side face a window opening of the door and the hollow spaces at the lower side face a door trim.

In the second embodiment, the cushion may include a gasbag filled with gas. The child seat may further include vent means for discharging the gas in the gasbag when a gas pressure in the gasbag reaches a predetermined pressure. When a high load is exerted on the gasbag, the vent means is provided for discharging the gas, thereby absorbing a shock. In the event of a car collision, when a load exerted on the gasbag is too small to operate the vent means of the gasbag, the child seat can be continuously used as it is without repair.

According to the third embodiment of the present invention, a child seat includes a cushion having local-inflation-preventing means for preventing a part of the cushion from locally expanding when another part of the cushion is pushed. Therefore, when the cushion is partially pressured, a pressure in the cushion rises sufficiently. The local-inflation-preventing means may be a tether belt or a stay.

In the third embodiment, the cushion may include a gasbag filled with gas. The child seat may further include vent means for discharging the gas in the gasbag when a gas pressure in the gasbag reaches a predetermined pressure. When a high load is exerted on the gasbag, the vent means is provided for discharging the gas, thereby absorbing a shock. In the event of a car collision, when a load exerted on the gasbag is too small to operate the vent means of the gasbag, the child seat can be continuously used as it is without repair.

BRIEF DESCRIPTION OF THE DRAWINGS

FIGS. 2(a) and 2(b) are sectional views of the child seat taken along line 2—2 in FIG. 1, wherein FIG. 2(a) shows the child seat before a vehicle is collided, and FIG. 2(b) shows the child seat after the vehicle is collided;

FIGS. 3(a) and 3(b) are sectional views of a child seat according to another embodiment of the present invention similar to FIGS. 2(a) and 2(b), wherein FIG. 3(a) shows the child seat before a vehicle is collided, and FIG. 3(b) shows the child seat after the vehicle is collided;

FIGS. 4(a) and 4(b) are sectional views of a child seat according to a further embodiment of the present invention similar to FIGS. 2(a) and 2(b), wherein FIG. 4(a) shows the child seat before a vehicle is collided, and FIG. 4(b) shows the child seat after the vehicle is collided; and FIGS. 5(a) and 5(b) are sectional views of a child seat according to a still further embodiment of the present invention similar to FIGS. 2(a) and 2(b), wherein FIG. 5(a) shows the child seat before a vehicle is collided, and FIG. 5(b) shows the child seat after the vehicle is collided.

DETAILED DESCRIPTION OF PREFERRED EMBODIMENTS

Figure 1:
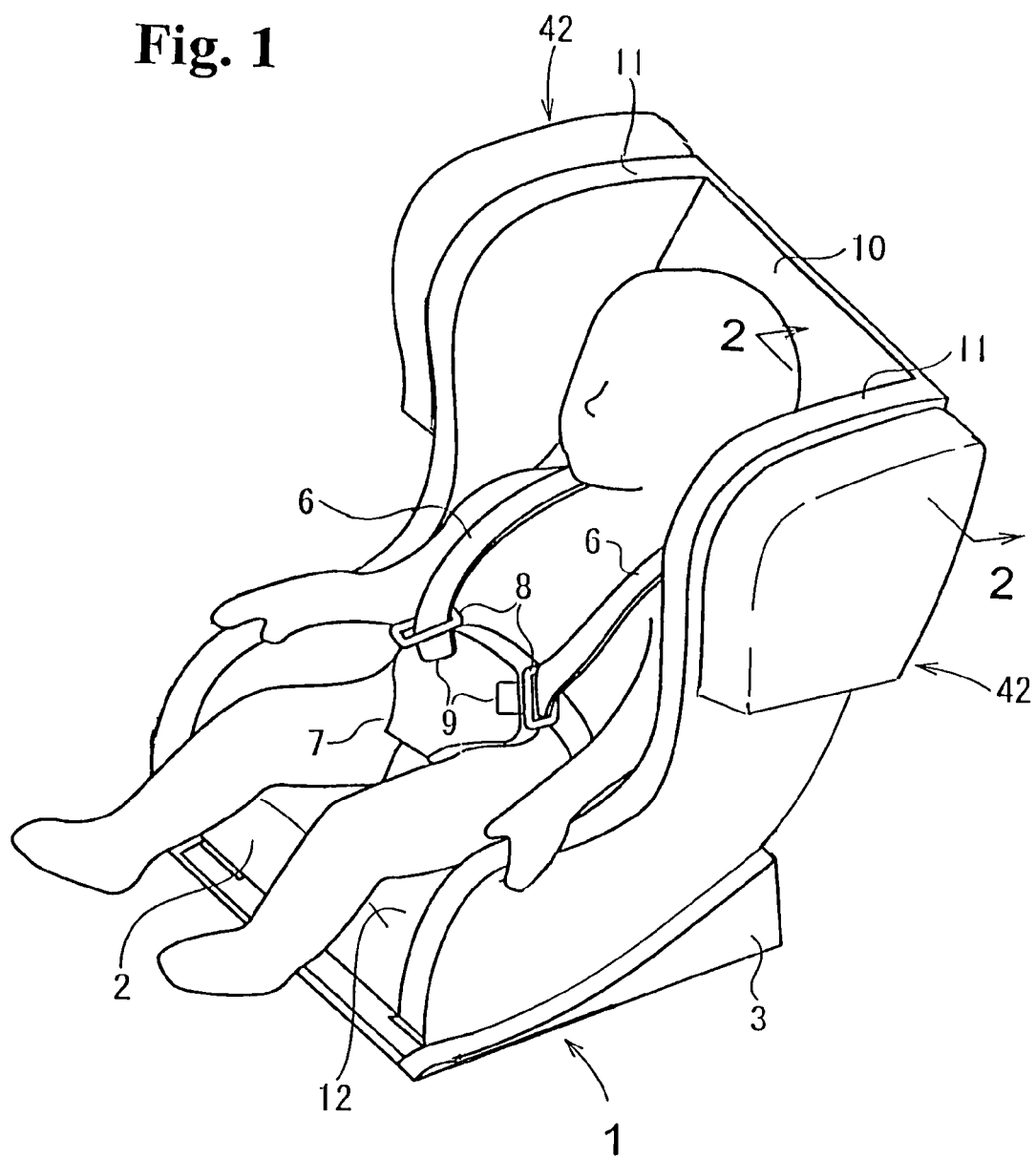
FIG. 1 is a perspective view of a child seat according to an embodiment of the present invention.
Figure 2A:
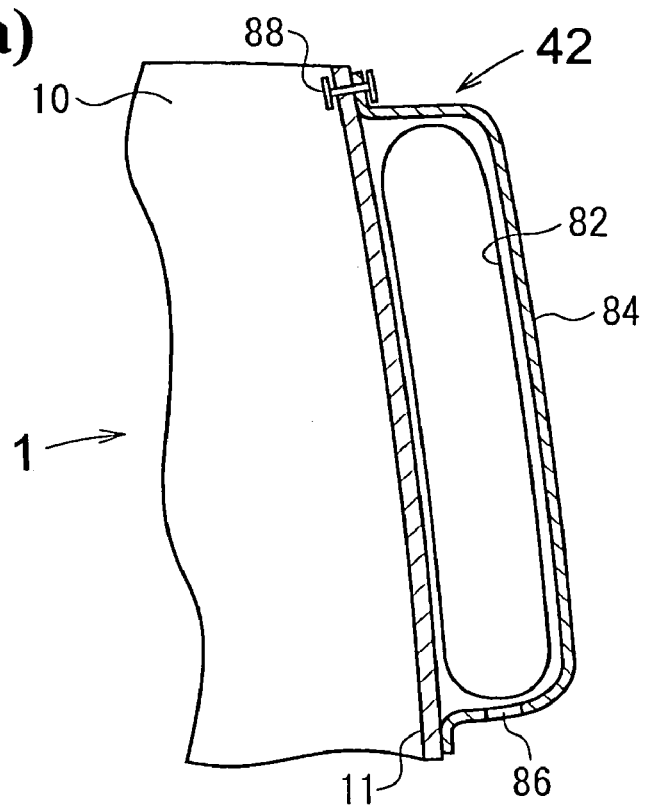
Figure 2B:
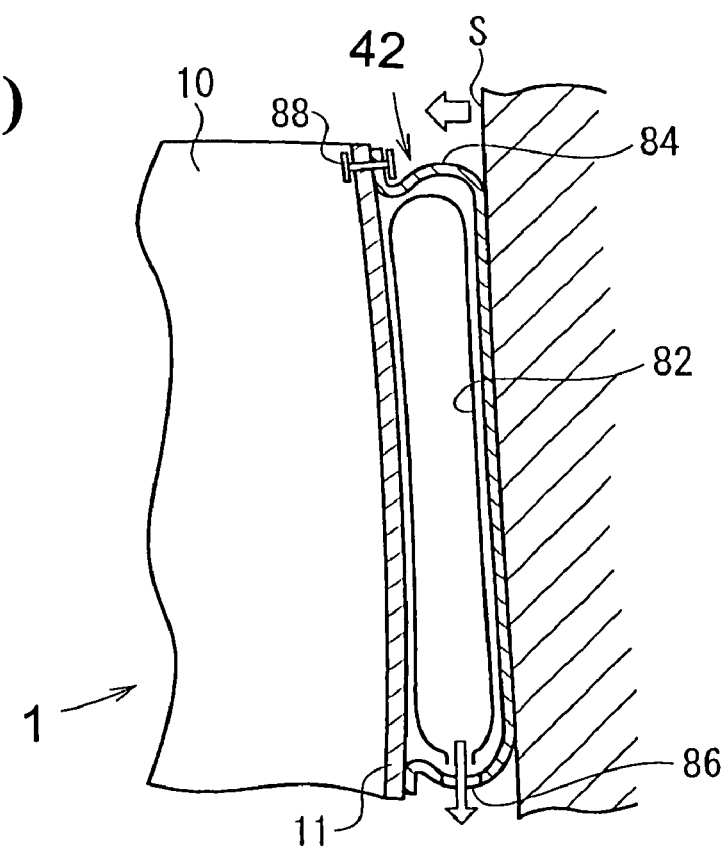

Hereunder, embodiments of the present invention will be explained with reference to the accompanying drawings. FIG. 1 is a perspective view of a child seat according to an embodiment of the present invention. FIGS. 2(a) and 2(b) are sectional views of the child seat taken along line 2—2 in FIG. 1, wherein FIG. 2(a) shows the child seat before a vehicle is collided, and FIG. 2(b) shows the child seat after the vehicle is collided.

As shown in FIG. 1, a child seat 1 includes a seat body 2 for seating a child and a base 3 for supporting the seat body 2 so that the seat body 2 can be reclined. The seat body 2 includes a seat portion 12 for placing a bottom of the child, a backrest 10 for receiving head and back portions of the child, and two side guards 11 extending from left and right sides of the backrest 10 towards a front of the child seat 1. Each of the side guards 11 extends from an edge of the backrest 10 to a left or right edge of the seat portion 12. Further, hollow cushions 42 are attached to outer surfaces of the side guards 11.

The seat body 2 has two child seatbelts 6 for restraining the child. The child seatbelts 6 extend through two belt tongues 8. A chest pad 7 is vertically disposed on a front of the seat portion 12. The chest pad 7 has two buckles 9 for latching the two respective belt tongues 8.

A rear portion of each of the child seatbelts 6 is drawn into the backrest 10 and is wound around a seatbelt retractor (not shown) with an emergency lock mechanism provided inside the seat body 2. In case of an automobile collision, the retractor is activated and locked, thereby preventing the child seatbelt 6 from being pulled out. The seatbelt retractor may be omitted. The child seat 1 is fixed on a seat of the automobile with a seatbelt (not shown). The child is seated on the seat body 2, and the child seatbelts 6 are fastened. Then, the belt tongues 8 of the seatbelts 6 are latched into the buckles 9.

As shown in FIGS. 2(a) and 2(b), each of the cushions 42 includes a gasbag 82 filled with gas and a cover shield 84 for covering the gasbag 82. The cover shield 84 has a vent hole 86 disposed in a circumferential side surface thereof for communicating with outside. The gasbag 82 is disposed along the outer side surface of the side guard 11. An entire periphery of the cover shield 84 is airtightly fixed to the side surface of the side guard 11 with fixtures 88 such as rivets.

The gasbag 82 is made of a synthetic resin thin film, and is filled with air at a pressure above the atmospheric pressure (for example, about 1.5 to 3 times higher than the atmospheric pressure). The cover shield 84 includes a molded member formed of a semi-rigid synthetic resin and a nonwoven fabric covering a surface of the molded member.

In the child seat 1 having the structure described above, when the child seat 1 hits a compartment side surface S in the event of a side car collision or the like as shown in FIG. 2(b), the cushion 42 receives the compartment side surface S. When a high load is exerted on the cushion 42 from the compartment side surface S, and an inner pressure of the gasbag 82 reaches a predetermined pressure, a portion of the gasbag 82 facing the vent hole 86 is broken. Accordingly, the gas in the gasbag 82 flows out, so that a shock from the compartment side surface S is absorbed.

FIGS. 3(a) and 3(b) are sectional views of a child seat according to another embodiment of the present invention similar to FIGS. 2(a) and 2(b), wherein FIG. 3(a) shows the child seat before a vehicle is collided, and FIG. 3(b) shows the child seat after the vehicle is collided. In this embodiment, separate upper and lower cushions 60 and 62 are provided on the outer side of each of the left and right side guards 11.

As shown in FIG. 3(b), the upper cushion 60 is arranged to face a window opening W at a side of a cabin, and the lower cushion 62 is arranged to face a door trim D. The cushions 60 and 62 have hollow interiors, and gasbags 64 and 66 filled with gas are housed in the cushions 60 and 62. The gasbags 64 and 66 are formed of a thin synthetic resin film, and are constructed to break for discharging the gas when an inner pressure exceeds a predetermined level. The gasbags 64 and 66 are filled with air at a pressure higher than the atmospheric pressure (for example, about 1.5 to 3 times higher than the atmospheric pressure). Air may be filled at the atmospheric pressure.

The cushions 60 and 62 have half shell shapes surrounding outward surfaces and side circumferences of the gasbags 64 and 66. Peripheries of the cushions 60 and 62 are airtightly fixed to the side guard 11. The cushions 60 and 62 include thin molded members formed of a synthetic resin and unwoven fabric covering the molded members. Each of the cushions 60 and 62 has a vent hole 68 at a side circumference thereof for releasing the gas to outside.

In the child seat 1 having such an structure, when the child seat 1 hits a side of the cabin in a car crash, the lower cushion 62 receives the door trim D and the upper cushion 60 supports a window glass of the window opening W or a colliding article (B-pillar, vehicle, telegraph post, passenger and so on, not shown). The door trim D and the window glass or the colliding article apply a high load to the cushions 60 and 62 to push the gasbags 66 and 64, respectively. When the inner pressures in the gasbags 64 and 66 exceed a predetermined level, portions of the gasbags 64 and 66 at the respective vent holes 68 are broken, so that the gas in the gasbags 64 and 66 flows to the exterior, thereby absorbing an impact from the door trim D and the window glass or the colliding article.

In this embodiment, the two separate upper and lower cushions 60 and 62 are provided on the outer side of each side guard 11, and face the window opening W at the side of the cabin and the door trim D. Accordingly, as shown in FIG. 3(b), when the child seat 1 hits the side of the cabin when the window glass is open and only the lower cushion 62 is pushed by the door trim D, the gas flows out from the gasbag 66 in the lower cushion 62 to absorb the impact. Due to the cushions 60 and 62 provided on the outer side of the side guard 11, it is not necessary to provide an airbag, thereby making the child seat 1 simple.

Figure 4A:
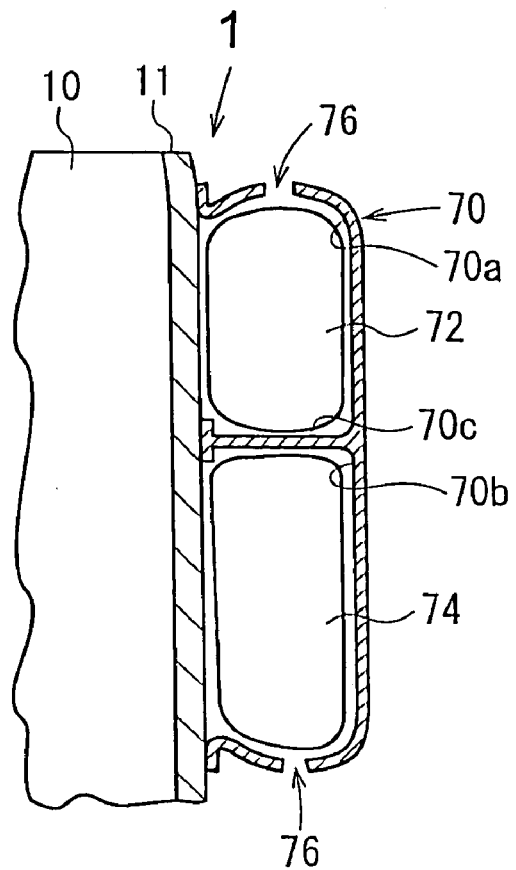
Figure 4B:
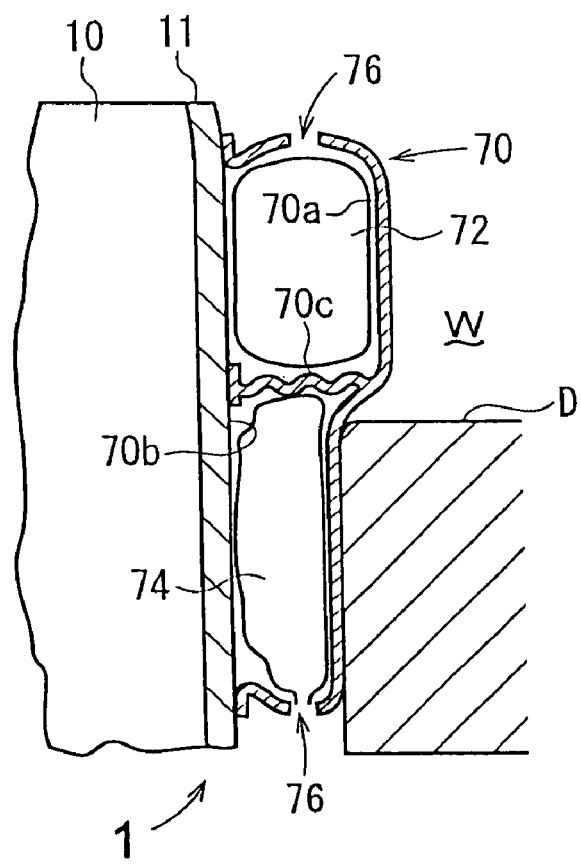

FIGS. 4(a) and 4(b) are sectional views of a child seat according to a further embodiment of the present invention similar to FIGS. 2(a) and 2(b), wherein FIG. 4(a) shows the child seat before a vehicle is collided, and FIG. 4(b) shows the child seat after the vehicle is collided. In this embodiment, the child seat 1 includes a cushion 70 on each of the outsides of the left and right side guards 11. The cushion 70 extends from the left and right sides of the backrest 10 toward the left and right sides of the seat 12.

The cushion 70 has an interior divided into two separate upper and lower hollow spaces 70a and 70b. The upper hollow space 70a is arranged at a cushion region facing the window opening W at the side of the cabin when the child seat 1D is mounted on a car seat. The lower hollow space 70b is arranged at a cushion region facing the door trim D. A partition wall 70c is disposed for partitioning the interior of the cushion 70 into the upper hollow space 70a and the lower hollow space 70b. The partition wall 70c extends up to a height nearly same as that of a lower rim of the window opening W (or an upper rim of the door trim D) when the child seat 1D is mounted on the car seat.

The upper hollow space 70a and the lower hollow space 70b include gasbags 72 and 74 filled with gas, respectively. The gasbags 72 and 74 are constructed to break for discharging the gas when the inner pressure exceeds a predetermined level. The cushion 70 has a half shell shape partitioned by the partition wall 70c into the upper and lower chambers, and is attached to the side of the side guard 11 so as to surround the outward surfaces and the side circumferences of the gasbags 72 and 74. A periphery of the cushion 70 and a rim of the partition wall 70c are airtightly fixed to the side guard 11 around the hollow spaces 70a and 70b. The cushion 70 includes a thin molded member having the partition wall 70c formed of a synthetic resin and unwoven fabric covering the molded member. The cushion 70 has vent holes 76 facing the hollow spaces 70a and 70b at a side circumference thereof.

In the child seat 1 having such an structure, when the child seat 1 hits the side of the cabin in a car crash, the lower hollow space 70b of the cushion 70 is pushed by the door trim D and the upper hollow space 70a is pushed by the window glass of the window opening W or a colliding article (B-pillar, crash vehicle, telegraph post, passenger and so on, not shown). The gasbags 72 and 74 receive load from the door trim D and the window glass or the colliding article, respectively. When the inner pressures in the gasbags 72 and 74 exceed a predetermined level, the portions of the gasbags 72 and 74 at the vent holes 76 are broken. Accordingly, the gases in the gasbags 72 and 74 flow to the exterior, thereby absorbing the impact from the door trim D and the window glass or the colliding article.

In this embodiment, two separate upper and lower hollow spaces 70a and 70b are provided in the cushion 70 for facing the window opening W at the side of the cabin and the door trim D. The gasbags 72 and 74 are housed in the hollow spaces 70a and 70b, respectively. Accordingly, when the child seat 1 hits the side of the cabin when the window glass is open as shown in FIG. 4(b) and only the lower hollow space 70b is pushed by the door trim D, the gas flows out from the gasbag 74 of the lower hollow space 70b to absorb the impact. Due to the cushion 70 provided on the outer side of the side guard 11, it is not necessary to provide an airbag, thereby making the child seat 1 simple.

The present invention is not limited to the embodiment described above. For example, the child seat has the two upper and lower hollow spaces in the cushion provided on the side of the side guard. Alternatively, the child seat may have three or more hollow spaces at vertically different positions in the cushion provided on the side of the side guard.

Figure 5A:
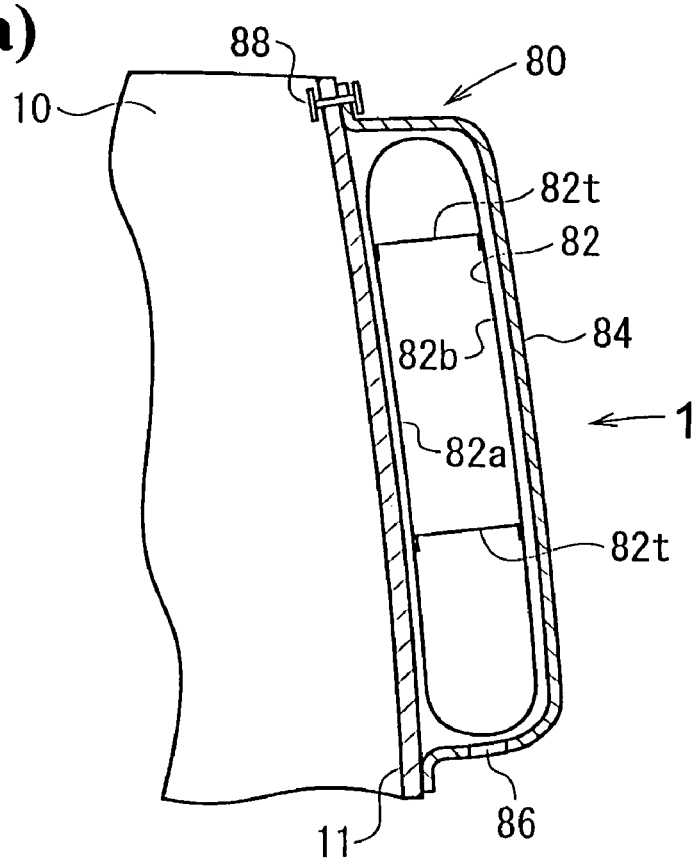
Figure 5B:
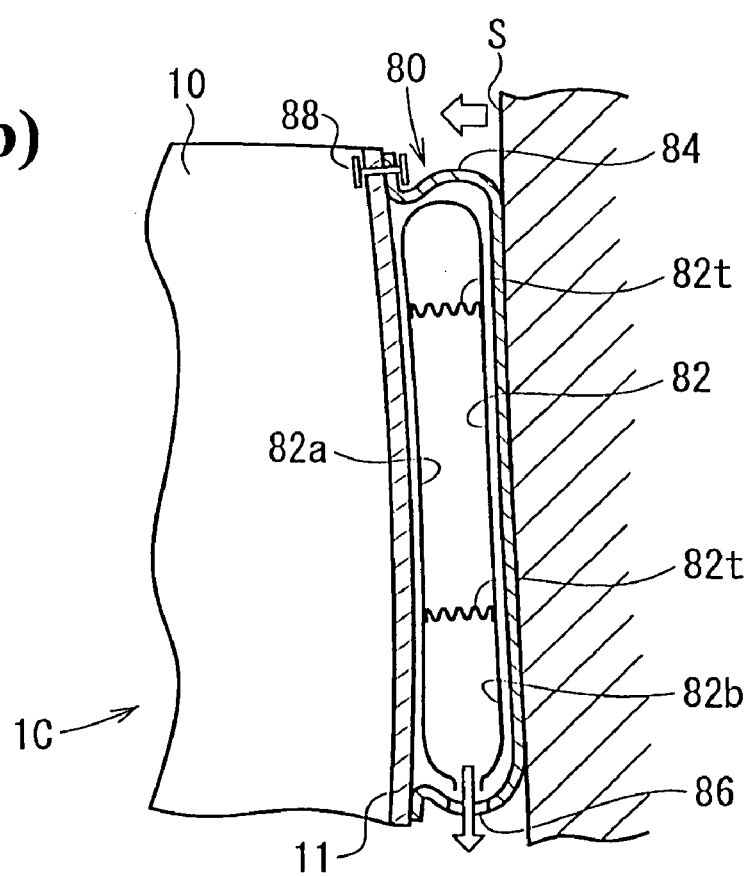

FIGS. 5(a) and 5(b) are sectional views of a child seat according to a still further embodiment of the present invention similar to FIGS. 2(a) and 2(b), wherein FIG. 5(a) shows the child seat before a vehicle is collided, and FIG. 5(b) shows the child seat after the vehicle is collided. In this embodiment, the child seat 1 has a cushion 80 on each of the outer sides of the side guards 11.

The cushion 80 has a gasbag 82 filled with air and a cover shield 84 for covering the gasbag 82. The cushion 80 communicates with the outside through a vent hole 86 provided in a peripheral surface of the cover shield 84. The gasbag 82 covers each of the outer sides of the side guards 11. An entire edge of the cover shield 84 is airtightly fastened to each of the outer sides of the side guards 11 with fasteners 88 such as rivets. The gasbag 82 is formed of a synthetic resin thin film and filled with air at a pressure higher than the atmospheric pressure (for example, about 1.5 to 3 times higher than the atmospheric pressure). The cover shield 84 includes a molded member formed of a semi-rigid synthetic resin and non-woven fabric covering the member.

The gasbag 82 includes gasbag tether belts 82t for preventing a part of the gasbag 82 from locally inflating when another part of the gasbag 82 is pushed. One end of each of the gasbag tether belts 82t is attached to an inner surface of the gasbag 82 adjacent to the side guard 11 (inner side surface 82a) with coupling means such as bonding or welding. The other end thereof is attached to an inner surface of the gasbag 82 facing the interior side S of the vehicle (outer side surface 82b). The tether belts 82t connect the inner side surface 82a and the outer side surface 82b at several positions in the gasbag 82 for preventing the local inflation of the gasbag 82.

When the child seat 1 hits the interior side S of the vehicle in a side collision as shown in FIG. 5(b), the cushion 80 receives the interior side S of the vehicle and is subjected to a large force from the interior side S of the vehicle. When a pressure in the gasbag 82 exceeds a predetermined pressure, the gasbag 82 breaks to open at a position adjacent to the vent hole 86 to release the gas, thereby absorbing the impact on the child seat 1 from the interior side S of the vehicle.

When the child seat 1 hits the interior side S of the vehicle in a side collision, a window at the interior side S (not shown) may be opened, so that only a door trim (not shown) under the window pushes a bottom portion of the gasbag 82. In this case, the tether belts 82t prevent the gasbag 82 from expanding locally, so that the pressure in the gasbag 82 securely rises to break the gasbag 82.

The present invention is not limited to the embodiment described above. For example, the gasbag tether belts are disposed only in a lateral direction of the gasbag (toward the interior side of a vehicle). Alternatively, the tether belts may be disposed in the vertical or front-rear direction of the gasbag. In the present invention, a structure other than the tether belt may be used as means for preventing local inflation of the gasbag.

While the invention has been explained with reference to the specific embodiments of the invention, the explanation is illustrative and the invention is limited only by the appended claims.

What is claimed is:

1. A child seat for protecting a child in a vehicle, comprising:

a seat body including a seat portion, a backrest, and right and left side guards, and a cushion immovably fixed onto an outer side surface of at least one of the side guards for absorbing an impact applied thereto, said cushion including a gasbag filled with gas in advance and a vent device disposed at the gasbag, said vent device discharging the gas when a gas pressure in the gasbag exceeds a predetermined pressure due to load applied thereto so that the load applied to the seat body is absorbed by the gasbag.

2. A child seat according to claim 1, wherein said cushion includes a plurality of cushion parts, each of said cushion parts having a hollow space therein.

3. A child seat according to claim 1, wherein said cushion has an interior partitioned into a plurality of hollow spaces.

4. A child seat according to claim 1, wherein said gasbag includes a local-inflation preventing device, said local-inflation-preventing device preventing a part of the cushion from locally expanding when another part of the cushion is pushed.

5. A child seat according to claim 4, wherein said local-inflation-preventing device is a tether belt or a stay.

6. A child seat according to claim 1, wherein said gasbag is filled with the gas in a pressure about 1.5 to 3 times higher than an atmospheric pressure.

7. A child seat for protecting a child in a vehicle, comprising:

a seat body including a seat portion, a backrest, and right and left side guards, and a cushion immovably fixed onto an outer side surface of at least one of the side guards for absorbing an impact applied thereto, said cushion including a gasbag filled with gas in advance and a vent device disposed at the gasbag, said vent device discharging the gas when a gas pressure in the gasbag exceeds a predetermined pressure due to load applied thereto so that the load applied to the seat body is absorbed by the gasbag, wherein said cushion further includes a cover shield covering the gasbag and having a vent hole, said gasbag being broken at a portion corresponding to the vent hole when the gas pressure in the gasbag exceeds the predetermined pressure.

8. A child seat according to claim 7, wherein said cushion is disposed only laterally outside the seat body.

9. A child seat according to claim 1, wherein said gasbag is broken when the gas pressure in the gasbag exceeds the predetermined pressure due to the load applied thereto.

10. A child seat according to claim 1, wherein said gas bag is formed separately from the seat body, and one gas bag is immovably fixed laterally outside each of the right and left side guards relative to the backrest.

11. A child seat according to claim 10, wherein said side guards extend substantially perpendicularly from entire right and left side portions of the seat portion and the backrest.

* * * * *